(12) United States Patent
    Soulhi et al.

(10) Patent No.: US 12,659,342 B2
(45) Date of Patent: Jun. 16, 2026

(54) METHOD AND SYSTEM FOR DETECTING VULNERABILITIES IN AI INFERENCE MODELS

(71) Applicant: Verizon Patent and Licensing Inc., Basking Ridge, NJ (US)

(72) Inventors: Said Soulhi, Saint Cloud, FL (US); Yousif Targali, Sammamish, WA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 91 days.

(21) Appl. No.: 18/638,202

(22) Filed: Apr. 17, 2024

(65) Prior Publication Data
    US 2025/0330482 A1     Oct. 23, 2025

(51) Int. Cl.
    *H04L 9/40* (2022.01)
(52) U.S. Cl.
    CPC ................................ *H04L 63/1433* (2013.01)
(58) Field of Classification Search
    CPC .............................. G06N 5/04; H04L 63/1433
    USPC ................................... 726/25; 709/223, 225
    See application file for complete search history.

(56) References Cited

U.S. PATENT DOCUMENTS

| | | | | |
|---|---|---|---|---|
| 11,556,815 B1* | 1/2023 | Stave | ..................... | G06N 20/20 |
| 2023/0370498 A1* | 11/2023 | Uekawa | ................... | G06N 5/04 |
| 2024/0177023 A1* | 5/2024 | Ezrielev | ................ | G06N 20/00 |
| 2024/0177028 A1* | 5/2024 | Ezrielev | ................ | G06N 20/00 |
| 2024/0177179 A1* | 5/2024 | Ezrielev | ............ | G06Q 30/0201 |
| 2024/0331880 A1* | 10/2024 | Schroeter | .............. | G16H 10/60 |

* cited by examiner

*Primary Examiner* — Liang Che A Wang

(57) ABSTRACT

A method, a device, and a non-transitory storage medium provide an inference model monitoring service. A network device stores a first inference model and a second inference model that is a derivative of the first inference model. The network device performs a weight comparison of connection weights of the second inference model against connection weights of the first inference model and assigns a weight vulnerability indicator. The network device performs a manifold comparison of a reduced dimensional manifold of the second inference model to a reduced dimensional manifold of the first inference model and assigns a manifold vulnerability indicator. The network device generates a vulnerability status of the second inference model based on the different indicators and performs a remedial action for the second inference model.

20 Claims, 8 Drawing Sheets

100

DATA NETWORK
150

NETWORK
110

Inference Model
Vulnerability
Monitor (IMVM)
120

Network
Device(s)
115

END
DEVICE
180

120

320

320

METHOD AND SYSTEM FOR DETECTING VULNERABILITIES IN AI INFERENCE MODELS

BACKGROUND INFORMATION

Advanced cellular networks, such as 5G networks and beyond, are highly distributed due to hardware virtualization and disaggregation (i.e., a split of hardware and software). Artificial intelligence (AI) is also transforming the way networks function, making them more autonomous with the expectation to make future networks (e.g., 6G networks, 7G networks, etc.) AI-native. AI inference models may be distributed over numerous network components. Consequently, the inference models can be vulnerable to attacks or unintentional data shifts causing the degradation of the model's performance due to lack of representative training and tuning data available in the model training phase.

DETAILED DESCRIPTION

The following detailed description refers to the accompanying drawings. The same reference numbers in different drawings may identify the same or similar elements. Also, the following detailed description does not limit the invention.

Artificial intelligence (AI) and/or machine learning (ML) is already in active use today in wireless networks, such as a 5G wireless network, and is actively under development for future generation wireless networks (e.g., 5G-Advanced, Sixth Generation (6G), Seventh Generation (7G), etc.). In such networks, AI inference models are distributed over many network components (e.g., management systems, Open RAN Intelligent Controller (O-RIC), Edge AI, Layer 1 AI, etc.). The successes and ubiquity of machine learning methods have spurred efforts towards their security management. Particularly, there is a need for quantitative modeling to detect vulnerabilities in the inference models.

Systems and methods described herein provide techniques for monitoring AI inference models and detecting security concerns in the models. The inference model monitoring service uses a zero-trust architecture for AI inference models. The inference model monitoring service reduces the risk of AI inference model vulnerabilities due to their increasing entanglement with network elements and the challenges presented by disaggregation. Among other features, the inference model monitoring service uses manifold learning to detect inference model misbehaviors, since many measurements or observations in the real world may manifest as non-Euclidean data.

Figure 1:
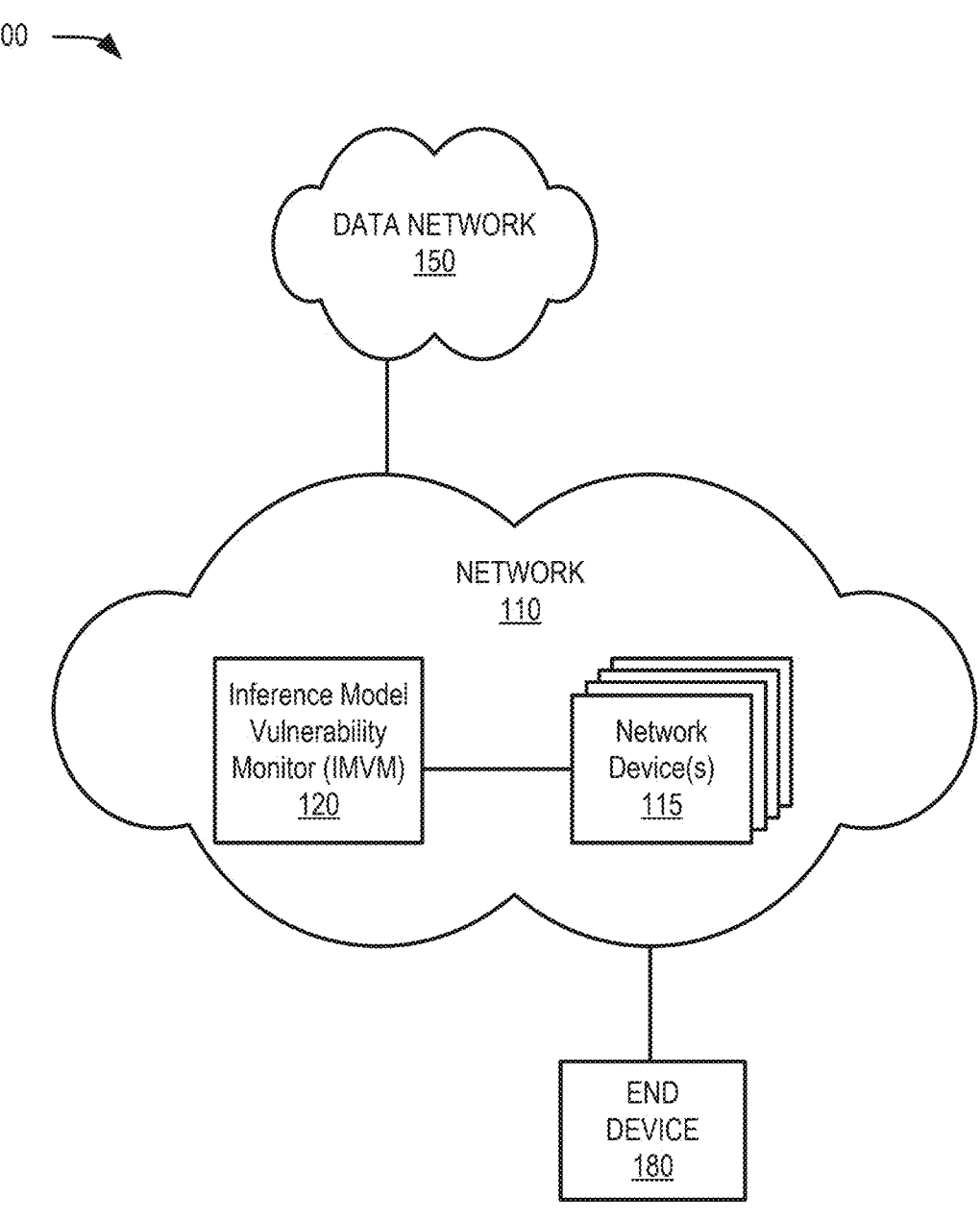
FIG. 1 provides an example of an environment in which an inference model monitoring service for mobile networks may be implemented.

FIG. 1 is a diagram illustrating an exemplary environment 100 in which the inference model monitoring service, as described herein, may be implemented. As illustrated, environment 100 includes a network 110. Network 110 includes network devices 110 and an inference model vulnerability monitor (IMVM) 120. As further illustrated, environment 100 includes a data network 150 and an end device 180.

Environment 100 includes communication links between network 110 and end devices 180, between network 110 and data network 150, and between network devices 115 and IMVM 120. Environment 100 may be implemented to include wired, optical, and/or wireless communication links among the devices and the network illustrated. A communication connection may be direct or indirect. For example, an indirect communication connection may involve an intermediary device and/or an intermediary network not illustrated in FIG. 1. The number and the arrangement of communication links shown in environment 100 are illustrative. Also, the number and the arrangement of devices and network shown in environment 100 are illustrative.

A device may be implemented according to a centralized computing architecture, a distributed computing architecture, or a cloud computing architecture (e.g., an elastic cloud, a private cloud, a public cloud, etc.). Additionally, a device may be implemented according to one or multiple network architectures (e.g., a client device, a server device, a peer device, a proxy device, and/or a cloud device).

Network 110 may include a network associated with a wireless carrier. Network 110 may include, for example, a radio access network (RAN), a core network, and other networks. For example, network 110 may include a local area network (LAN), a wireless LAN, a wide area network (WAN), a metropolitan area network (MAN), an optical network, a cable television network, a satellite network, a wireless network (e.g., a 5G network, a 6G or future network, a Code Division Multiple Access (CDMA) network, a general packet radio service (GPRS) network, a Long Term Evolution (LTE) network (e.g., 4G network), or a cellular network), an ad hoc network, a telephone network (e.g., the Public Switched Telephone Network (PSTN)), an intranet, or a combination of networks. Network 110 may allow the delivery of Internet Protocol (IP) services to UE device 110 and may interface with and/or include other networks, such as data network 150.

Depending on the implementation, network 110 may include one or multiple types of network devices 115. For example, network devices 115 may include RAN devices, such as a next generation Node B (gNB), an enhanced LTE (eLTE) evolved Node B (eNB), an eNB, a radio network controller (RNC), a RAN intelligent controller (RIC), a base station controller (BSC), a remote radio head (RRH), a baseband unit (BBU), a radio unit (RU), a remote radio unit (RRU), a centralized unit (CU), a distributed unit (DU), a small cell node (e.g., a picocell device, a femtocell device, a microcell device, a home eNB, a home gNB, etc.), a 5G ultra-wide band (UWB) node, a future generation wireless access device (e.g., a 6G wireless station, a 7G wireless station, or another generation of wireless station). In FIG. 1, an access station, which may include one of network devices 115, may establish a wireless connection with end device 180 to network 110.

In other implementations, network devices 115 may include core network devices, such as a user plane function (UPF), a network data analytics function (NWDAF), an access and mobility management function (AMF), a session management function (SMF), a unified data management (UDM) device, a unified data repository (UDR), an application function (AF), an authentication server function (AUSF), a security anchor function (SEAF), a network slice selection function (NSSF), a network repository function (NRF), a policy control function (PCF), a network exposure function (NEF), a service capability exposure function (SCEF), a mobility management entity (MME), a packet data network gateway (PGW), a serving gateway (SGW), a home subscriber server (HSS), an authentication, authorization, and accounting (AAA) server, a policy and charging rules function (PCRF), and/or a charging system (CS). According to other implementations, network devices 115 may include additional, different, and/or fewer network devices than those described. For example, network device 115 may include a gateway, a router, a switch, a firewall, a bridge, a proxy server, a server, or some other type of device that processes and/or transfers data. According to implementations described herein, one or more of network devices 115 may implement AI inference models to support operations of network 110.

IMVM 120 includes logic that provides the inference model monitoring service, as described herein. For example, IMVM 120 may perform vulnerability analysis of deployed inference models used by various network devices or network functions of network 110. According to an implementation, and as described further herein, IMVM 120 may perform a comparison of weights in baseline and deployed inference models, perform a comparison of architectures in baseline and deployed inference models, perform a comparison of weight changes for successive iterations, and perform a comparison of a reduced dimensional manifolds for successive iterations (or derivatives) of deployed inference models.

IMVM 120 may be included within an orchestration layer, a proxy layer, a RAN layer, or a core layer of network 110. For example, IMVM 120 may be implemented in computing device or network device that is separate from network devices 115 and performs monitoring for multiple deployed inference models. According to another implementation, IMVM 120 may be implemented in one or more of network devices 115. IMVM 120 is described further connection with FIGS. 2-7.

Data network 150 may include, for example, a packet data network. In an implementation, end device 180 may connect to data network 150 via network 110. Data network 150 may also include and/or be connected to a local area network (LAN), a wide area network (WAN), a metropolitan area network (MAN), an autonomous system (AS) on the Internet, an optical network, a cable television network, a satellite network, a wireless network, an ad hoc network, a telephone network (e.g., PSTN) or a cellular network, an intranet, or a combination of networks.

End device 180 includes a device that has computational and communication capabilities. End device 180 may be implemented as a mobile device, a portable device, or a stationary device. For example, end device 180 may be implemented as a smartphone, a personal digital assistant, a tablet, a netbook, a wearable device, a set top box, an infotainment system in a vehicle, a smart television, a game system, a music playing system, or some other type of user device. According to various exemplary embodiments, end device 180 may be configured to execute various types of software (e.g., applications, programs, etc.). The number and the types of software may vary from one end device 180 to another end device 180. For example, end device 180 may include logic to receive and present data or content from data network 150.

Figure 2:
FIG. 2 is a diagram illustrating an example of a functional framework in which the inference model monitoring service may be implemented.
Figure 2:
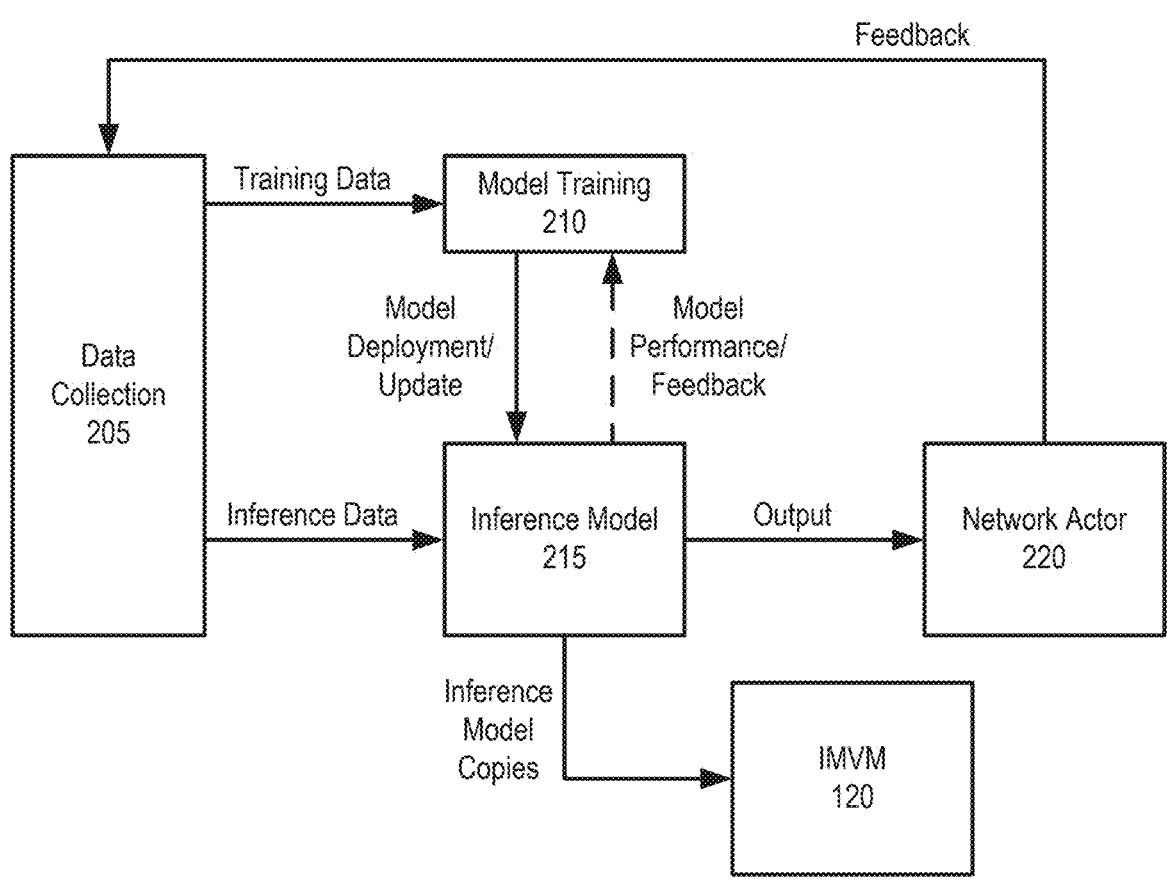

FIG. 2 illustrates an example of a functional framework 200, for network intelligence, in which the inference model monitoring service may be implemented. Framework 200 may be included, for example, within a portion of network 110. In one implementation, framework 200 may be distributed among one or more network devices 115 and IMVM 120. As shown in FIG. 2, a data collection component 205 may receive and store data relevant to a particular machine learning objective. Data collection component 205 may provide a predetermined data set (e.g., training data) for model training 210. Model training 210 may use a deep neural network to learn how to analyze the training data and make inferences. Model training 210 may eventually generate an inference model 215 to which new data (e.g., inference data) for the particular objective may be applied.

In some implementations, one or more components of inference model 215 may include machine learning models, such as a deep learning neural network and/or another type of neural network. The inference model may include multiple layers of nodes (or neurons) with a certain arrangement of connections between the nodes. Weights (i.e., numerical values) may be associated with the connections between the nodes. Each connection between nodes may have an associated weight that signifies a strength and direction (e.g., positive or negative) of the influence one node has on another. In other implementations, inference model 215 may include a K-nearest neighbors (KNN) classifier, a decision tree classifier, a naïve Bayes classifier, a support vector machine (SVM) classifier, tree based (e.g., a random forest) classifier using Euclidian and/or cosine distance methods, a logistic regression classifier, a linear discriminant analysis classifier, a quadratic linear discriminant analysis classifier, a maximum entropy classifier, a kernel density estimation classifier, a principal component analysis (PCA) classifier, a gradient boosting framework (e.g. XGBoost, LightGBM) and/or another type of classifier. Other configurations may be implemented.

Inference model 215 may receive the inference data as input and provide an output, such as a determination of what the inference data represents. The output may be received by a network actor 220 (e.g., one of network devices 115), which may apply the output to manage network operations and/or configurations. Network actor 220 may provide feedback to data collection component 205 to indicate, for example, the accuracy/results of the output.

The decision process of a deep neural network, such as may be used in inference model 215, is difficult to investigate. Even if the architecture and weight values are known, the specific decision processes generally do not exist in an explainability framework for human understanding. According to implementations described herein, inference model vulnerabilities may be detected in a zero-trust architecture without regard to actual model results. The inference model monitoring service provides an autonomous way of detecting vulnerabilities on inference model 215 and discovering of weights representation and modeling. As shown in FIG. 2, IMVM 120 may receive a copy of each deployed inference model and/or inference model update. IMVM 120 may apply zero trust principles to monitor vulnerability of the inference model, such as verifying the model weights, the model architecture, and the model behavior over time.

Figure 3:
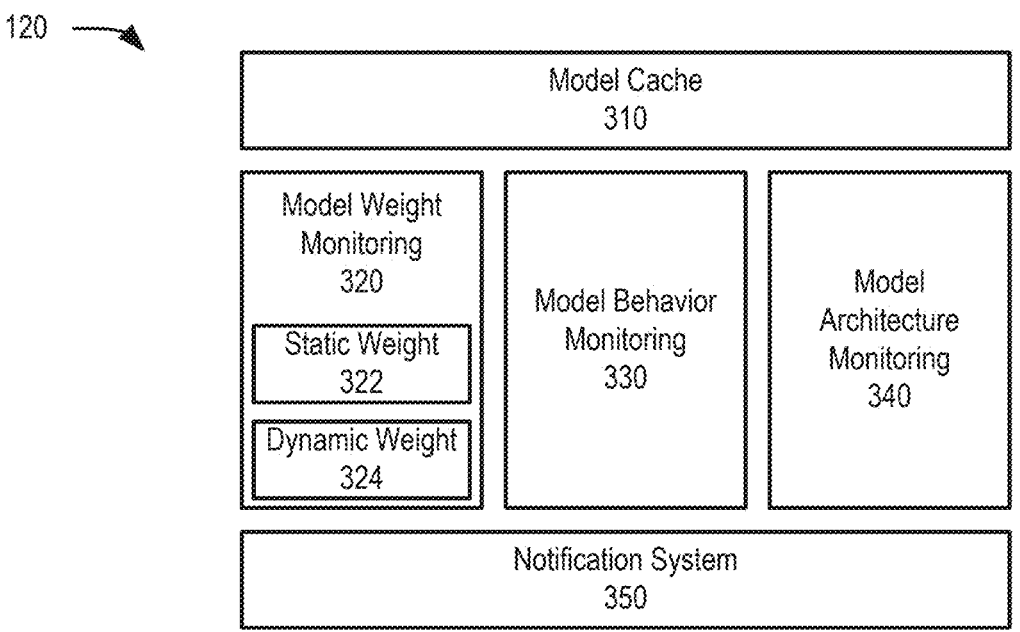
FIG. 3 is a block diagram illustrating logical components of an inference model vulnerability monitor (IMVM), according to an implementation.

FIG. 3 provides an overview of logical components of IMVM 120. As shown in FIG. 3, IMVM 120 may include a model cache 310, model weight monitoring 320, model behavior monitoring 330, model architecture monitoring 340, and a notification system 350. The components of IMVM 120 may be implemented, for example, in a device 800 (FIG. 8) via processor 810 executing software 820 from memory 815. Alternatively, some or all of the components of IMVM 120 may be implemented via hard-wired circuitry. Therefore, IMVM 120 may include additional, fewer and/or different logical components than those depicted in FIG. 3.

Model cache 310 may store a baseline inference model and any subsequent iterations of the interference model. An iteration may be an update for a trained model, a dynamic model at some time after deployment, or another derivation of a baseline model. In one implementation, model cache 310 may receive a copy of each model deployment and update provided from model training 210. In other implementations, IMVM 120 may retrieve copies of inference models on a periodic basis. Data in model cache may be accessed by each of model weight monitoring 320, model behavior monitoring 330, and model architecture monitoring 340.

Model weight monitoring 320 may apply algorithms to detect potential tampering with weights of inference model 215. Weight (also referred to as connection weight) represents the strength of the connection between nodes/units (artificial neurons) of the inference model. Model weight monitoring 320 may include a static weight check 322 and a dynamic weight check 324. Model weight monitoring 322 may identify inference model 215 as a static weight model or a dynamic weight model. For inference models with static weights, static weight check 322 may compare weights of a current/active iteration of inference model 215 with weights of a stored baseline model (e.g., from model cache 310). For inference models with dynamic weights, dynamic weight check 324 may compare distances between weight tensors of a current/active version of inference model 215 with a previous version of inference model 215. For example, dynamic weight check 324 may extract model weights from the current iteration of inference model 215 and a baseline inference model. In other implementations, dynamic weight check 324 may extract model weights from the current iteration of inference model 215 and a previous iteration of inference model 215. Dynamic weight check 324 may compute shifts in the connection weights of the current inference model from connection weights of a baseline or preceding inference model.

For both static weight models and dynamic weight models, model weight monitoring 320 may provide an analysis result (e.g., potential vulnerability vs. no threat) to notification system 350, for example, after each analysis. Potential vulnerabilities may be identified/flagged based on, for example, any weight changes detected in static models or any detected shifts beyond a threshold level in dynamic models. Model weight monitoring 320 is described further in connection with FIGS. 4A and 4B.

Model behavior monitoring 330 may generate manifolds of inference model 215 and apply algorithms to detect behavior of inference model 215 over time. A manifold may be considered a topological space that is locally Euclidean. A manifold is an object of dimensionality d that is embedded in some higher dimensional space. For a given inference model 215, model behavior monitoring 330 may build a low-dimensional manifold model. The low dimensional manifold may be computed to simplify comparisons with previous inference model iterations, as manifold comparisons in high dimensional space may be computationally intensive and/or prohibitive. Model behavior monitoring 330 may compare a manifold from the current iteration of inference model 215 and a manifold of a baseline inference model. In another implementation, model behavior monitoring 330 may compare a manifold from the current iteration of inference model 215 and a manifold of a previous iteration of inference model 215. Model behavior monitoring 330 may provide an analysis result (e.g., potential vulnerability vs. no threat) to notification system 350 after each analysis or whenever a change over a threshold is detected. Model behavior monitoring 330 is described further in connection with FIG. 5.

Model architecture monitoring 340 may apply algorithms to detect a model architecture attack. Model architecture monitoring 340 may compare, for example, an architecture of a current/active version of inference model 215 with a baseline version of inference model 215. Model architecture monitoring 340 may provide an analysis result (e.g., potential vulnerability vs. no threat) to notification system 350 after each analysis or whenever a change is detected. Model architecture monitoring 340 is described further in connection with FIG. 6.

Notification system 350 may receive analysis results from model weight monitoring 320, model behavior monitoring 330, and model architecture monitoring 340. Based on the analysis results, notification system 350 may provide an alert or other notification to a network administrator (e.g., using an end device 180) or a network monitoring system. For example, notification system 350 may send a text message, alert signal, or other indication to a designated administrator account when a potential vulnerability is indicated by one or more of model weight monitoring 320, model behavior monitoring 330, and model architecture monitoring 340. In one implementation, the alert or notification may include a link to stored analysis results from model weight monitoring 320, model behavior monitoring 330, and model architecture monitoring 340.

In another implementation, notification system 350 may initiate a remedial action based on analysis results received from one or more of model weight monitoring 320, model behavior monitoring 330, and model architecture monitoring 340. For example, in addition to notifying a network administrator, notification system 350 may signal a network function or orchestration system to revert to a prior iteration or baseline of inference model 215. As another example, notification system 350 may temporarily pause/disable use of a potentially vulnerable inference model 215 or pause use of a network function that relies on the potentially vulnerable inference model 215. In still another example, notification system 350 may use different message distribution groups for different notifications (e.g., expanding the number of recipients when potential vulnerabilities are detected) or higher threat possibilities (e.g., expanding the number of recipients when multiple types of monitoring components detect threats). Additionally, or alternatively, notification system 350 may provide timestamps and device identifiers associated with the potentially vulnerable inference model 215 for use with data retrieval and analytics systems.

Figure 4A:
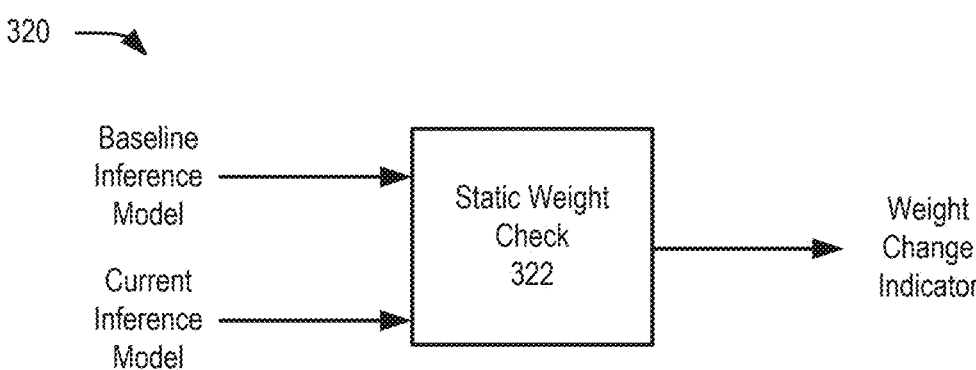
FIG. 4A is a diagram illustrating a process for a static weight check for model weight monitoring, according to an implementation.

FIG. 4A is a diagram illustrating a process for static weight check 322 for model weight monitoring 320. Static weight check 322 may be used, for example, with supervised learning applications. As shown in FIG. 4A, static weight check 322 may obtain (e.g., from model cache 310), a baseline inference model and a current inference model. Static weight check 322 may extract weights from the current model and compare those weights with the baseline weights to detect if changes in weights have occurred. An unauthorized change of the weights can destroy the accuracy of the inference model. In some embodiments, an unauthorized change refers to any change that occurs in an inference model outside of the inference model development lifecycle, e.g., training of the model or the like. Static weight check 322 may output (e.g., to notification system 350) a model weight change indicator value. For example, the weight change indicator value may be "0" when no changes are detected and "1" when changes are detected.

Figure 4B:
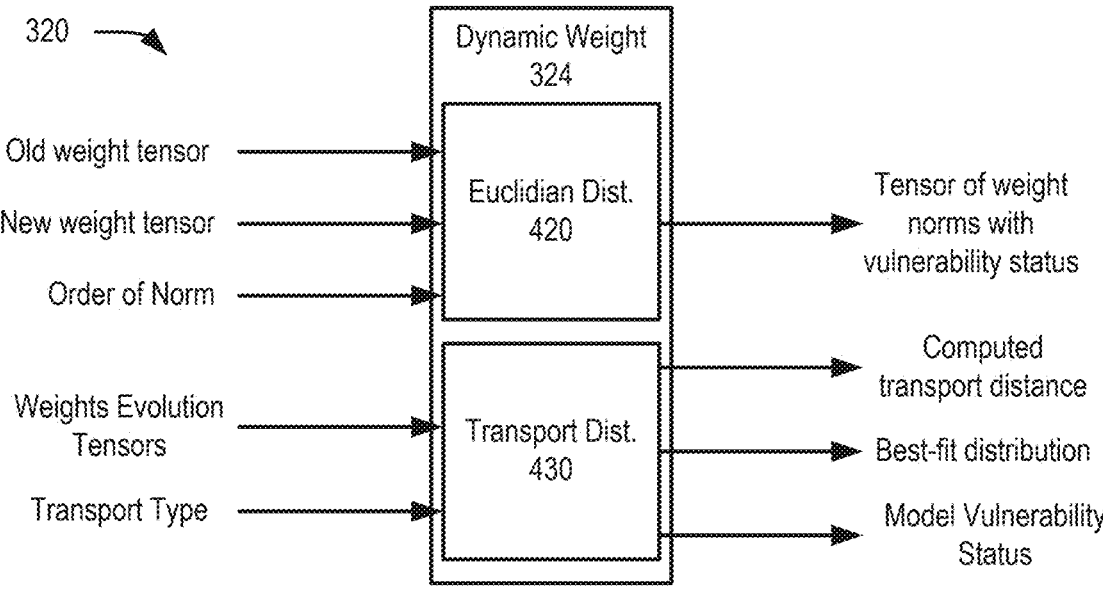
FIG. 4B is a diagram illustrating a process for a dynamic weight check for model weight monitoring, according to an implementation.

FIG. 4B is a diagram illustrating a process for a dynamic weight check 324 for model weight monitoring 320. Dynamic weight check 324 may be used, for example, with reinforcement learning applications. Dynamic weight check 324 may compute shifts in observed model weights (e.g., between a current model and a baseline model) and analyze drift patterns. As shown in FIG. 4B, dynamic weight check 324 may include Euclidian distance component 420 and a transport distance component 430.

Euclidian distance component 420 may compute distances between weight tensors in different iterations of inference model 215. Euclidian distance component 420 may obtain (e.g., from model cache 310) an old weight tensor (e.g., from a previous iteration of inference model 215), a new weight tensor (e.g., from a current iteration of inference model 215), and an order of the norm for the model (e.g., Frobenius, Euclidian, p-norm for p>0, etc.). Euclidian distance component 420 may compute the norm of elements across dimensions of the weight tensors and raise an alert/notification upon the computed norm reaching a certain distance threshold. In some implementations, Euclidian distance component 420 may compute other distance types, such as transport distances or other information-theoretic quantities (e.g., entropy, mutual information, etc.). In some implementations, an alert/notification may trigger human analysis to update a vulnerability status for the current inference model 215. Euclidian distance component 420 may output (e.g., to notification system 350) a tensor of weight norms with a vulnerability status.

Figure 4C:
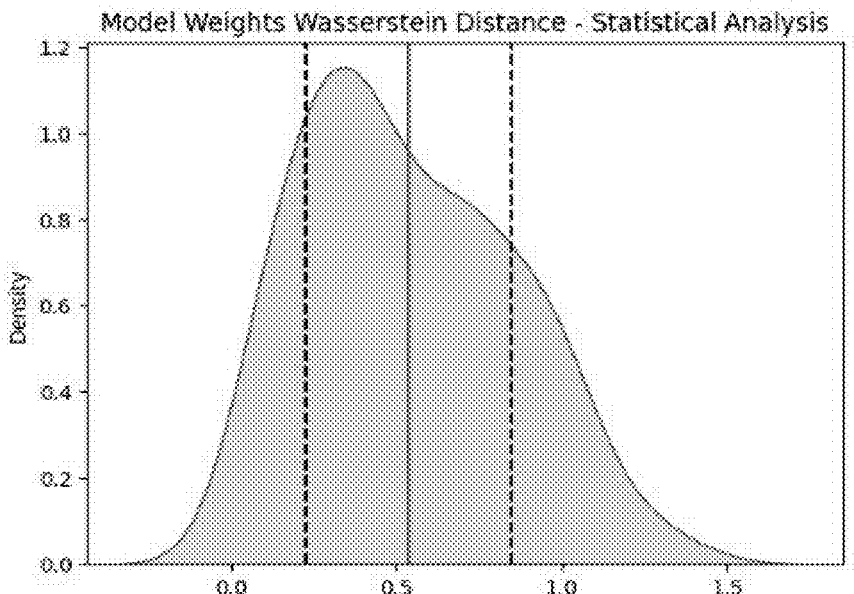
FIGS. 4C and 4D are charts illustrating statistical analyses for a dynamic weight check, according to different implementations.
Figure 4D:
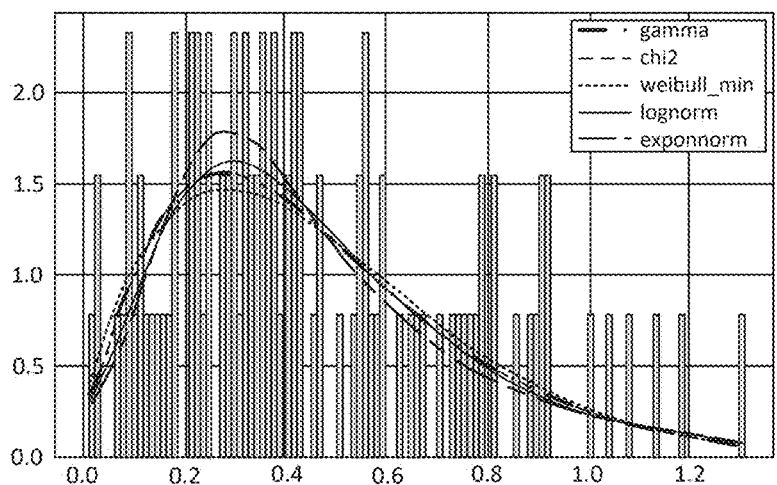

Transport distance component 430 may compute transport distances between weight tensors. Transport distance component 430 may obtain (e.g., from Euclidian distance component 420 or model cache 310) weights evolution tensors and a transport type (e.g., Wasserstein distance, etc.). Transport distance component 430 may convert the weight tensors to weight distributions and compute transport distances. Transport distance component 430 may perform statistical analysis, such as an extreme value analysis (EVA) and obtain the best fitted distributions of transport data. FIG. 4C illustrates a statistical analysis of model weights Wasserstein distance. FIG. 4D illustrates an EVA distribution fit, where the best distribution for the weight transport data is found to be the Weibull Minimum Extreme Value distribution according the lowest sum-square error criteria. Transport distance component 430 may raise a notification if an unreasonable distributional model for the data shift is detected (e.g., change of the best-suited distribution from gamma to lognorm). In some implementations, an alert/notification may trigger human analysis to update a vulnerability status for the current inference model 215. Transport distance component 430 may output a computed transport distance of the model weight, a best-fit distribution with optimized parameters, and a model vulnerability status.

Figure 5:
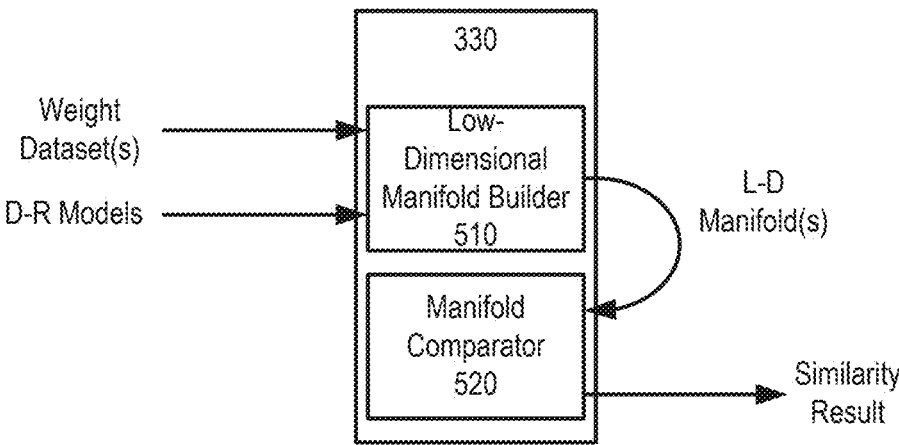
FIG. 5 is a diagram illustrating a process for model behavior monitoring over time, according to an implementation.

FIG. 5 is a diagram illustrating a process for model behavior monitoring over time, according to an implementation. Referring to FIG. 5, model behavior monitoring 330 may monitor inference model behavior over time. Model behavior monitoring 330 may include a low dimensional manifold builder 510 and a manifold comparator 520.

Low dimensional manifold builder 510 may build a low-dimensional manifold for finding approximate lower dimensional representations of weights data. Low dimensional manifold builder 510 may store a variety of dimension-reduction (D-R) models and obtain (e.g., from model cache 310) a weight data set for an inference model 215. Examples of dimension-reduction models may include kernel-PCA, Locally Linear Embedding (LLE), ISOMAP, Diffusion Maps, t-SNE, UMAP, Autoencoders, and the like. Low dimensional manifold builder 510 may train and tune the best dimension-reduction model depending on the topological properties of the weight data set of inference model 215. As a particular example, UMAP assumes that the data is uniformly distributed on a locally connected Riemannian manifold. Other dimension-reduction models may prioritize preserving distance (i.e., ISOMAP) or preserve topology (i.e., LLE). Low dimensional manifold builder 510 may generate a low-dimensional manifold (e.g., a topological space that locally resembles Euclidean space near each point) for the inference model 215.

Manifold comparator 520 may compare iterations of the low-dimensional manifold over time. More particularly, manifold comparator 520 may monitor how similar the manifolds of the weights of a model are over time. Manifold comparator 520 may use an appropriate manifold comparison technique to determine if two manifolds are similar. In such cases, the underlying model is deemed to be behaving properly over time. Conversely, two manifolds diverging over time may be an indication of vulnerability in the inference model 215. According to one implementation, manifold comparator 520 may generate a Manifold Topology Divergence score, which can be used for security monitoring.

Figure 6:
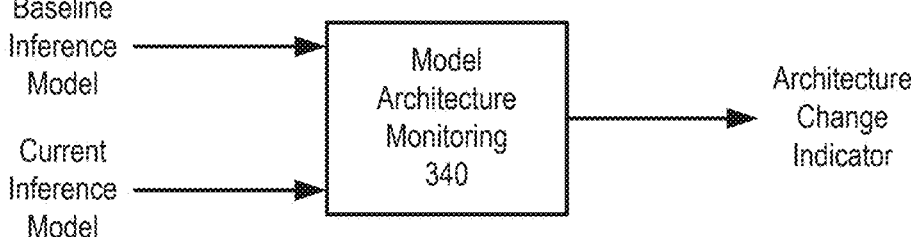
FIG. 6 is a diagram illustrating a process for model architecture monitoring, according to an implementation.

FIG. 6 is a diagram illustrating model architecture monitoring 340. Model architecture monitoring 340 may be used, for example, to detect architecture model attacks by comparing current inference models to a model architecture baseline. As shown in FIG. 6, model architecture monitoring 340 may obtain (e.g., from model cache 310) a baseline inference model and a current inference model. Model architecture monitoring 340 may identify the model architecture/structure. For each current inference model, model architecture monitoring 340 may iterate all the model layers and retrieve all structural details (such as a layer name, type of the layer, input dimension, output dimension, activation function, parameter count, etc.). Model architecture monitoring 340 may compare the structural details of the current model with structural details of the baseline model. Any change in the structural details may indicate a vulnerability to the inference model. Model architecture monitoring 340 may output (e.g., to notification system 350) a model architecture change indicator value. For example, the architecture change indicator value may be "0" when no changes are detected and "1" when changes are detected.

Figure 7:
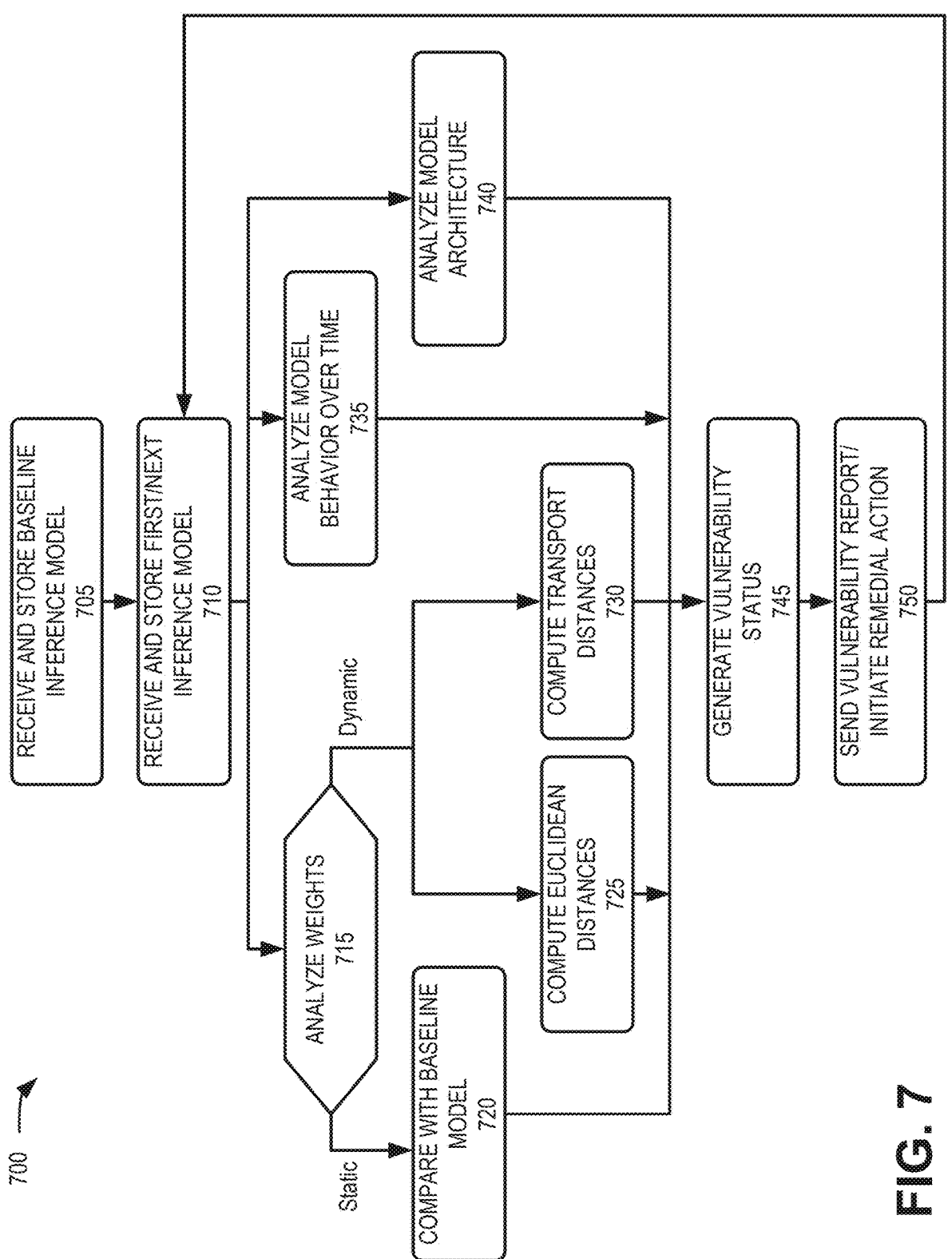
FIG. 7 is a flow chart of example operations for the inference model monitoring service, according to an implementation.

FIG. 7 is a diagram of a process flow 700 illustrating exemplary operations for the inference model monitoring service. In one implementation, the operations of process flow 700 may be performed by IMVM 120. In another implementation, some or all of the operations of process flow 700 may be performed by IMVM 120 in conjunction with one or more of network devices 115 of network environment 100.

Process 700 may include receiving and storing a baseline inference model (block 705) and receiving and storing a first inference model (block 710). For example, IMVM 120 may receive a copy of the initial or baseline version of inference model 215. IMVM 120 may also receive any updates to the deployed inference model 215 or a periodic copy of the currently deployed model. IMVM 120 may store in a memory (e.g., model cache 310) the baseline inference model and the first inference model.

Process 700 may further include analyzing the current inference model weights as a static or dynamic model (block 715). For example, IMVM 120 may detect if inference model 215 has static weights, such as used in supervised learning applications, or dynamic weights, such as used in reinforcement learning applications.

If the inference model uses static weights (block 715- "Static"), process 700 may include comparing the current inference model with the baseline model (block 720). For example, static weight 322 may extract weights from the current model and compare those weights with the baseline weights to detect if changes in weights have occurred.

If the inference model uses dynamic weights (block 715-"Dynamic"), process 700 may include computing Euclidian distances (block 725) and computing transport distances (block 730). For example, dynamic weight check 324 may compare distances between weight tensors of a current/active version of inference model 215 with a previous version of inference model 215. In one implementation, dynamic weight check 324 may use both Euclidian distance component 420 and transport distance component 430 to analyze drift patterns. Euclidian distance component 420 may compute the norm of elements across dimensions of weight tensors and raise an alert upon a certain threshold. Transport distance component 430 may compute transport distances and determine the best fit distributions of transport data.

Process 700 may also include analyzing the inference model behavior over time (block 735). For example, model behavior monitoring 330 may build low-dimensional manifolds of different model iterations to compare and track changes over time.

Process 700 may additionally include analyzing the architecture of the inference model (block 740). For example, model architecture monitoring 340 may compare, for example, an architecture a current/active version of inference model 215 with a baseline version of inference model 215.

Process 700 may include generating a vulnerability status (block 745) and sending a vulnerability report and/or initiate a remedial action (block 750). For example, each of the process blocks 720-740 may generate a result value indicating, for example, that no/acceptable changes were detected or that unacceptable changes were detected. In one implementation, IMVM 120 (e.g., notification system 350) may provide an alert or other notification to a network administrator or network monitoring system, for example, to indicate a vulnerability status for the current inference model based on the result values from model weight monitoring 320, model behavior monitoring 330, and/or model architecture monitoring 340. In another implementation, notification system 350 may initiate a remedial action, such as signaling a network function to revert to a prior iteration inference model 215 or temporarily pause use of a potentially vulnerable inference model 215.

Figure 8:
FIG. 8 is a diagram illustrating exemplary components of a device that may correspond to one or more of the devices illustrated herein.
Figure 8:
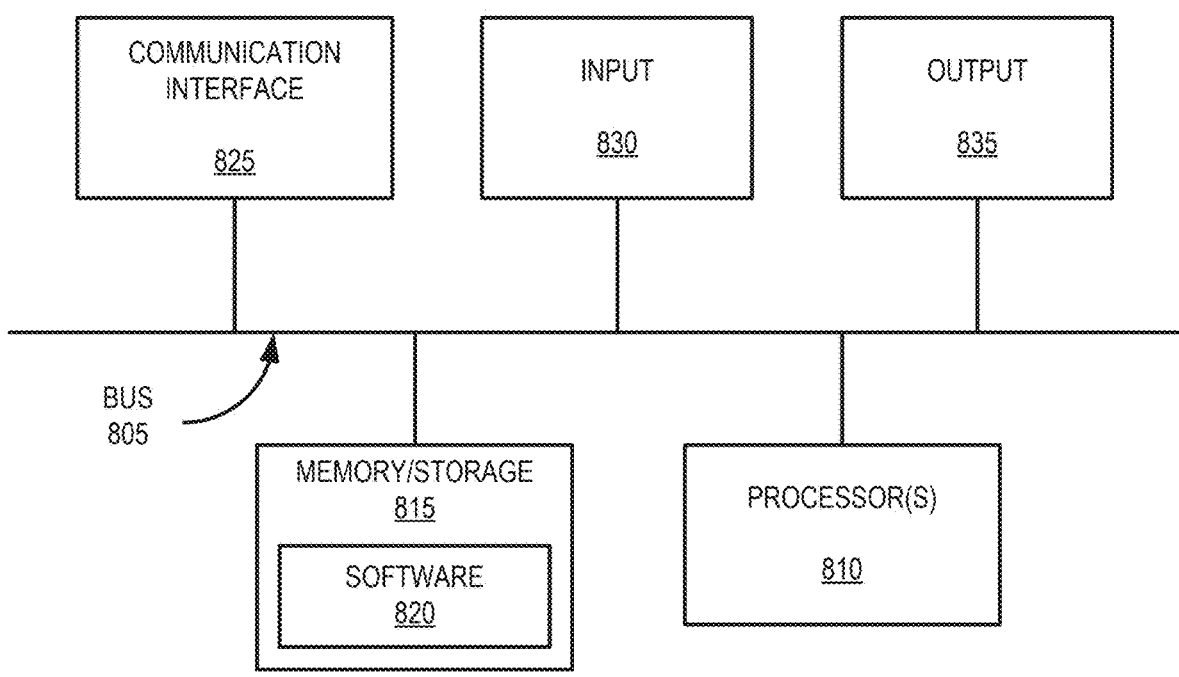

FIG. 8 is a diagram illustrating exemplary components of a device 800 that may correspond to one or more of the devices described herein. For example, device 800 may correspond to components included network devices 115, IMVM 120, end device 180, and/or other elements illustrated in FIGS. 1 and 2. As illustrated in FIG. 8, according to an exemplary embodiment, device 800 includes a bus 805, one or more processors 810, memory/storage 815 that stores software 820, a communication interface 825, an input 830, and an output 835. According to other embodiments, device 800 may include fewer components, additional components, different components, and/or a different arrangement of components than those illustrated in FIG. 8 and described herein.

Bus 805 includes a path that permits communication among the components of device 800. For example, bus 805 may include a system bus, an address bus, a data bus, and/or a control bus. Bus 805 may also include bus drivers, bus arbiters, bus interfaces, and/or clocks.

Processor 810 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/ or some other type of component that interprets and/or executes instructions and/or data. Processor 810 may be implemented as hardware (e.g., a microprocessor, etc.), a combination of hardware and software (e.g., a SoC, an ASIC, etc.), may include one or multiple memories (e.g., cache, etc.), etc. Processor 810 may be a dedicated component or a non-dedicated component (e.g., a shared resource).

Processor 810 may control the operations or a portion of the operations performed by device 800. Processor 810 may perform one or multiple operations based on an operating system and/or various applications or computer programs (e.g., software 820). Processor 810 may access instructions from memory/storage 815, from other components of device 800, and/or from a source external to device 800 (e.g., a network, another device, etc.). Processor 810 may perform an operation and/or a process based on various techniques including, for example, multithreading, parallel processing, pipelining, interleaving, etc.

Memory/storage 815 includes one or multiple memories and/or one or multiple other types of storage mediums. For example, memory/storage 815 may include one or multiple types of memories, such as, random access memory (RAM), dynamic random-access memory (DRAM), cache, read only memory (ROM), a programmable read only memory (PROM), a static random-access memory (SRAM), a single in-line memory module (SIMM), a dual in-line memory module (DIMM), a flash memory (e.g., a NAND flash, a NOR flash, etc.), and/or some other type of memory. Memory/storage 815 may include a hard disk (e.g., a magnetic disk, an optical disk, a magneto-optic disk, a solid-state disk, etc.), a Micro-Electromechanical System (MEMS)-based storage medium, and/or a nanotechnology-based storage medium. Memory/storage 815 may store data, software, and/or instructions related to the operation of device 800.

Software 820 includes an application or a program that provides a function and/or a process. Software 820 may include an operating system. Software 820 is also intended to include firmware, middleware, microcode, hardware description language (HDL), and/or other forms of instruction.

Communication interface 825 permits device 800 to communicate with other devices, networks, systems, devices, and/or the like. Communication interface 825 includes one or multiple wireless interfaces and/or wired interfaces. For example, communication interface 825 may include one or multiple transmitters and receivers, or transceivers (e.g., radio frequency transceivers). Communication interface 825 may include one or more antennas. For example, communication interface 825 may include an array of antennas. Communication interface 825 may operate according to a protocol stack and a communication standard. Communication interface 825 may include various processing logic or circuitry (e.g., multiplexing/de-multiplexing, filtering, amplifying, converting, error correction, etc.).

Input 830 permits an input into device 800. For example, input 830 may include a keyboard, a mouse, a display, a button, a switch, an input port, speech recognition logic, a biometric mechanism, a microphone, a visual and/or audio capturing device (e.g., a camera, etc.), and/or some other type of visual, auditory, tactile, etc., input component. Output 835 permits an output from device 800. For example, output 835 may include a speaker, a display, a light, an output port, and/or some other type of visual, auditory, tactile, etc., output component. According to some embodiments, input 830 and/or output 835 may be a device that is attachable to and removable from device 800.

Device 800 may perform a process and/or a function, as described herein, in response to processor 810 executing software 820 stored by memory/storage 815. By way of example, instructions may be read into memory/storage 815 from another memory/storage 815 (not shown) or read from another device (not shown) via communication interface 825. The instructions stored by memory/storage 815 cause processor 810 to perform a process described herein. Alternatively, for example, according to other implementations, device 800 performs a process described herein based on the execution of hardware (processor 810, etc.).

As described herein, a method, a device, and a non-transitory storage medium provide an inference model monitoring service. A network device stores a first inference model and a second inference model that is a derivative of the first inference model. The network device performs a weight comparison of connection weights of the second inference model against connection weights of the first inference model and assigns a weight vulnerability indicator. The network device performs a manifold comparison of a reduced dimensional manifold of the second inference model to a reduced dimensional manifold of the first inference model and assigns a manifold vulnerability indicator. The network device generates a vulnerability status of the second inference model based on the different indicators and performs a remedial action for the second inference model.

The foregoing description of embodiments provides illustrations but is not intended to be exhaustive or to limit the embodiments to the precise form disclosed. In the preceding description, various embodiments have been described with reference to the accompanying drawings. However, various modifications and changes may be made thereto, and additional embodiments may be implemented, without departing from the broader scope of the invention as set forth in the claims that follow. The description and drawings are accordingly to be regarded as illustrative rather than restrictive. For example, while IMVM 120 is described herein as a discrete element of network 110, in other implementations, IMVM 120 may be included within a network device 115 that includes other functionality.

In addition, while series of blocks have been described with regard to the processes illustrated in FIG. 7, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software executed by hardware. For example, a process or a function may be implemented as "logic" or as a "component." The logic or the component may include, for example, hardware (e.g., processor 810, etc.), or a combination of hardware and software. The embodiments have been described without reference to the specific software code since the software code can be designed to implement the embodiments based on the description herein and commercially available software design environments/languages.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory storage medium that stores data and/or information, such as instructions, program code, data structures, program modules, an application, etc. The program code, instructions, application, etc., is readable and executable by a processor of a computational device. A non-transitory storage medium includes one or more of the storage mediums described in relation to memory.

To the extent the aforementioned embodiments collect, store or employ personal information provided by individuals, or any other user data or subscription data, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

What is claimed is:

1. A method, comprising:

storing, by a network device, a first inference model for a network function of a wireless cellular network, wherein the first inference model includes multiple layers of connected nodes;

storing, by the network device, a second inference model, wherein the second inference model is an iteration of the first inference model at a time after deployment of the first inference model;

performing, by the network device, a weight comparison of connection weights of connected nodes in the second inference model against corresponding connection weights of the connected nodes in the first inference model;

assigning, by the network device, a weight vulnerability indicator based on the weight comparison, wherein the weight vulnerability indicator indicates whether there are changes in the connection weights;

performing, by the network device, a manifold comparison of a reduced dimensional manifold of the second inference model to a reduced dimensional manifold of the first inference model;

assigning, by the network device, a manifold vulnerability indicator based on the manifold comparison, wherein the manifold vulnerability indicator indicates a similarity between the first inference model and the second first inference model;

generating, by the network device, a vulnerability status of the second inference model based on the weight vulnerability indicator and the manifold vulnerability indicator, wherein the vulnerability status indicates whether the second inference model is vulnerable to attacks or data shifts; and performing, by the network device, an action based on the vulnerability status.

2. The method of claim 1, further comprising:

performing, by the network device, an architecture comparison of an architecture of the second inference model against an architecture of the first inference model; and assigning, by the network device, an architecture vulnerability indicator based on the architecture comparison, wherein the architecture vulnerability indicator indicates a similarity between the architecture of the first inference model and the architecture of the second first inference model, wherein generating the vulnerability status is further based on the architecture vulnerability indicator.

3. The method of claim 1, wherein performing the weight comparison comprises:

identifying the first inference model as a static weight model; and comparing the connection weights of the second inference model against the corresponding connection weights of the first inference model.

4. The method of claim 1, wherein performing the weight comparison, comprises:

identifying the first inference model as a dynamic weight model; and computing shifts in the connection weights of the second inference model from the connection weights of the first inference model.

5. The method of claim 4, wherein computing the shifts in the connection weights comprises:

computing a Euclidian distance between weight tensors for the first inference model and the second inference model.

6. The method of claim 4, wherein computing the shifts in the connection weights comprises:

computing a transport distance between weight tensors for the first inference model and the second inference model.

7. The method of claim 1, wherein performing the manifold comparison comprises:

generating the reduced dimensional manifold of the first inference model based on the connection weights of the first inference model; and generating the reduced dimensional manifold of the second inference model based on the connection weights of the second inference model.

8. The method of claim 7, wherein generating the reduced dimensional manifold of the first inference model includes selecting, from a group of available dimension-reduction models, a best fit dimension-reduction model for the first inference model; and wherein generating the reduced dimensional manifold of the second inference model includes selecting, from the group of available dimension-reduction models, a best fit dimension-reduction model for the second inference model.

9. The method of claim 1, wherein performing the action comprises one or more of:

sending to a network administrator a vulnerability report for the second inference model;

providing a signal to revert to a prior iteration of the second inference model;

disabling use of the second inference model; or pausing use of a network function, in the wireless cellular network, that relies on the second inference model.

10. One or more network devices, comprising:

one or more processors configured to execute instructions to:

store in a memory a first inference model for a network function of a wireless cellular network, wherein the first inference model includes multiple layers of connected nodes;

store in the memory a second inference model, wherein the second inference model is an iteration of the first inference model at a time after deployment of the first inference model;

perform a weight comparison of connection weights of connected nodes in the second inference model against corresponding connection weights of the connected nodes in the first inference model;

assign a weight vulnerability indicator based on the weight comparison, wherein the weight vulnerability indicator indicates whether there are changes in the connection weights;

perform a manifold comparison of a reduced dimensional manifold of the second inference model to a reduced dimensional manifold of the first inference model;

assign a manifold vulnerability indicator based on the manifold comparison, wherein the manifold vulnerability indicator indicates a similarity between the first inference model and the second first inference model;

generate a vulnerability status of the second inference model based on the weight vulnerability indicator and the manifold vulnerability indicator, wherein the vulnerability status indicates whether the second inference model is vulnerable to attacks or data shifts; and perform an action based on the vulnerability status.

11. The one or more network devices of claim 10, wherein the one or more processors are further to execute instructions to:

perform an architecture comparison of an architecture of the second inference model against an architecture of the first inference model; and assign an architecture vulnerability indicator based on the architecture comparison, wherein the architecture vulnerability indicator indicates a similarity between the architecture of the first inference model and the architecture of the second first inference model, wherein, when generating the vulnerability status, the one or more processors are further to execute instructions to base the vulnerability status on the architecture vulnerability indicator.

12. The one or more network devices of claim 10, wherein, when performing the weight comparison, the one or more processors are further to execute instructions to:

identify the first inference model as a dynamic weight model; and compute shifts in the connection weights of the second inference model from connection weights of the first inference model.

13. The one or more network devices of claim 12, wherein, when computing the shifts in the connection weights, the one or more processors are further to execute instructions to:

compute a Euclidian distance between weight tensors for the first inference model and the second inference model.

14. The one or more network devices of claim 12, wherein, when computing the shifts in the connection weights, the one or more processors are further to execute instructions to:

compute a transport distance between weight tensors for the first inference model and the second inference model.

15. The one or more network devices of claim 10, wherein, when performing the manifold comparison, the one or more processors are further to execute instructions to:

generate the reduced dimensional manifold of the first inference model based on the connection weights of the first inference model; and generate the reduced dimensional manifold of the second inference model based on the connection weights of the second inference model.

16. The one or more network devices of claim 15, wherein, when generating the reduced dimensional manifold of the first inference model, the one or more processors are further to execute instructions to:

select, from a group of available dimension-reduction models, a best fit dimension-reduction model for the first inference model.

17. A non-transitory computer-readable medium containing instructions executable by at least one processor of a network device, the non-transitory computer-readable medium comprising one or more instructions for:

storing, by a network device, a first inference model for a network function of a wireless cellular network, wherein the first inference model includes multiple layers of connected nodes;

storing, by the network device, a second inference model, wherein the second inference model is an iteration of the first inference model at a time after deployment of the first inference model;

performing, by the network device, a weight comparison of connection weights of connected nodes in the second inference model against corresponding connection weights of the connected nodes in the first inference model;

assigning, by the network device, a weight vulnerability indicator based on the weight comparison, wherein the weight vulnerability indicator indicates whether there are changes in the connection weights;

performing, by the network device, a manifold comparison of a reduced dimensional manifold of the second inference model to a reduced dimensional manifold of the first inference model;

assigning, by the network device, a manifold vulnerability indicator based on the manifold comparison, wherein the manifold vulnerability indicator indicates a similarity between the first inference model and the second first inference model;

generating, by the network device, a vulnerability status of the second inference model based on the weight vulnerability indicator and the manifold vulnerability indicator, wherein the vulnerability status indicates whether the second inference model is vulnerable to attacks or data shifts; and performing, by the network device, an action based on the vulnerability status.

18. The non-transitory computer-readable medium of claim 17, wherein the one or more instructions for performing the action further include instructions for:

sending to a network administrator a vulnerability report for the second inference model;

providing a signal to revert to a prior iteration of the second inference model;

disabling use of the second inference model; or pausing use of a network function that relies on the second inference model.

19. The non-transitory computer-readable medium of claim 17, wherein the one or more instructions include instructions for:

performing an architecture comparison of an architecture of the second inference model against an architecture of the first inference model; and assigning an architecture vulnerability indicator based on the architecture comparison, wherein the architecture vulnerability indicator indicates a similarity between the architecture of the first inference model and the architecture of the second first inference model, wherein the one or more instructions for generating the vulnerability status further include basing the vulnerability status on the architecture vulnerability indicator.

20. The non-transitory computer-readable medium of claim 19, wherein the one or more instructions for performing the architecture comparison further include instructions for:

obtaining, for each layer of the second inference model, structural details including a layer name, a type of layer, an input dimension, an output dimension, an activation function, and a parameter count; and comparing the structural details to the first inference model.

* * * * *